(No Model.)
H. B. COX.
ELECTRODE FOR MEDICAL BATTERIES.
No. 412,165. Patented Oct. 1, 1889.
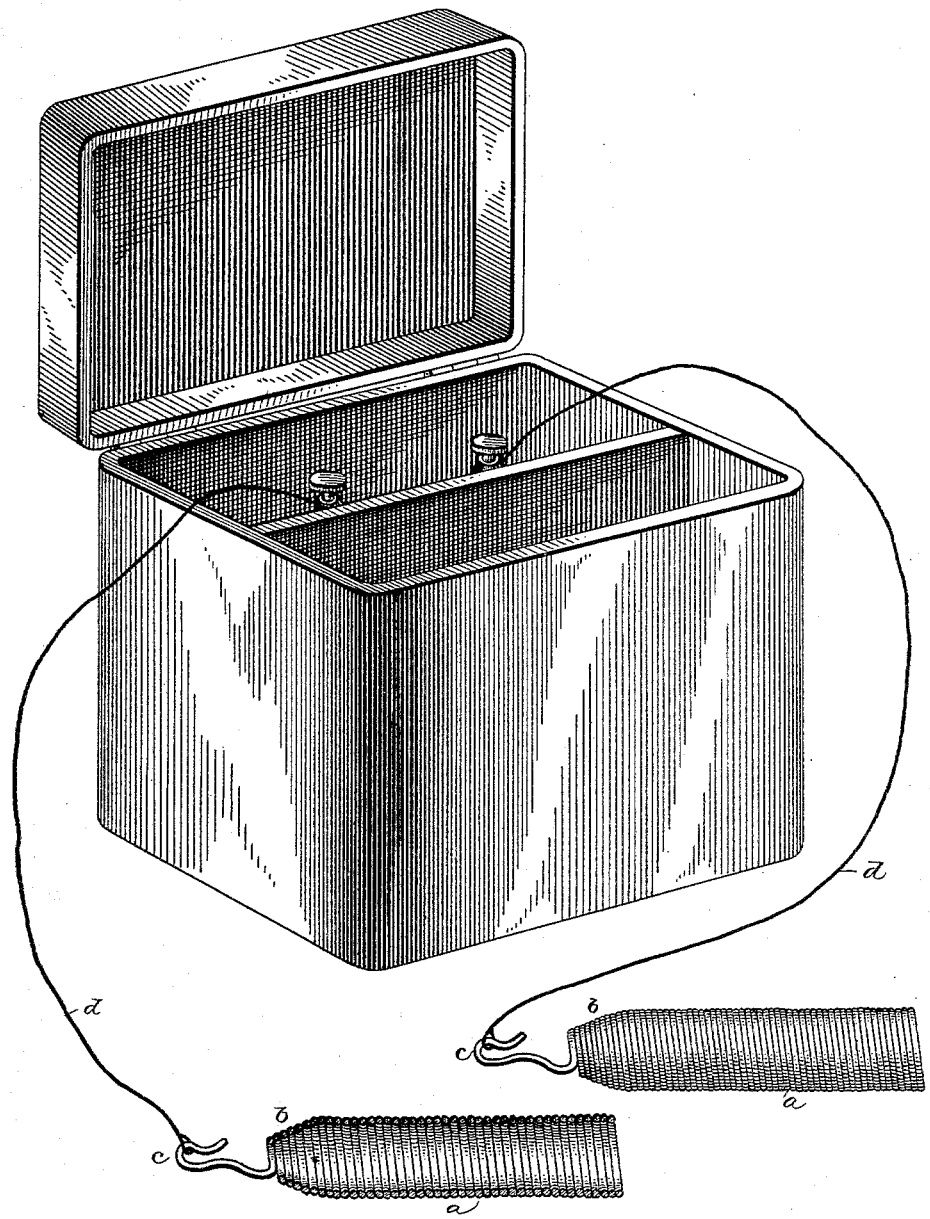
WITNESSES
INVENTOR
Harry B. Cox
per O. E. Duffy
Attorney

UNITED STATES PATENT OFFICE.

HARRY BARRINGER COX, OF NEW HAVEN, CONNECTICUT, ASSIGNOR TO THE H. B. COX ELECTRIC COMPANY, OF SAME PLACE.

ELECTRODE FOR MEDICAL BATTERIES.

SPECIFICATION forming part of Letters Patent No. 412,165, dated October 1, 1889.

Application filed March 8, 1889. Serial No. 302,469. (No model.)

*To all whom it may concern:*

Be it known that I, HARRY BARRINGER COX, of New Haven, in the county of New Haven and State of Connecticut, have invented certain new and useful Improvements in Electrodes for Batteries; and I do hereby declare that the following is a full, clear, and exact description of the invention, which will enable others skilled in the art to which it appertains to make and use the same, reference being had to the accompanying drawing, and to the letters of reference marked thereon, which form part of this specification.

My invention relates to an improvement in handles or electrodes for use with medical batteries or other sources of electricity adapted for giving "shocks."

The object of the invention is to provide an exceedingly simple and cheap handle or electrode, neat and tasty in appearance, and forming a yielding elastic hand-hold, said electrode consisting of a hollow cylinder open at the ends and formed of a single length of tightly-coiled flexible spring-wire, one end of the wire extending from the end of the cylinder with its extremity formed for connection with one of the conductors, thereby forming a yielding elastic electrode, which when grasped by the hand will conform itself to the shape of the hand and be pleasant and pliable to the touch and feeling.

The accompanying drawing represents the case and conductors of a medical battery, showing the electrodes connected to the conductors, one of the electrodes being shown in longitudinal section.

In the drawing, the reference-letter $a$ indicates the electrodes, each consisting of a hollow cylinder open at the ends, one end being preferably slightly tapered, as shown. This electrode is composed of a length of elastic flexible wire, stiff enough to retain its shape when bent, which is tightly coiled, as shown, so that the coils will lie closely against each other and form a closed cylinder open at the ends. Toward one end of the cylinder the coils preferably gradually decrease in diameter, thereby tapering that end, as shown at $b$, and the free end of the wire extends longitudinally from this end $b$ to form a means $c$, whereby the electrode-handle can be secured to one of the conductors $d$. In the present case the wire end $d$ is formed into a hook, to readily engage or disengage a loop on the end of the conductor.

It will be readily seen that this electrode forms a flexible and pliable handle, conforming itself to the interior shape of the hand when grasping it, and that the full effect of the current will be felt, as the same will follow the course of the wire around and around the exterior of the handle.

What I claim is—

1. An electrode consisting of a hollow pliable elastic cylinder formed of coiled spring-wire, substantially as described.

2. An electrode-handle consisting of a single length of tightly-coiled spring-wire forming a flexible handle adapted to conform itself to the interior shape of the hand when grasping the same, substantially as described.

3. As a new article of manufacture, a medical-battery electrode consisting of a pliable coil of wire, one end of the wire being extended to form means whereby the electrode can be connected with a conductor, substantially as described.

4. An electrode-handle consisting of a closed pliable cylinder open at the ends and composed of a single coil of spring-wire having one end formed for connection with a conductor, substantially as described.

5. An electrode-handle consisting of a closed flexible cylinder tapered at one and open at both ends and formed of a single coil of spring-wire having one end extended and bent to form a hook, substantially as described.

In testimony that I claim the foregoing as my own I affix my signature in presence of two witnesses.

HARRY BARRINGER COX.

Witnesses:
O. E. DUFFY,
HUBERT E. PECK.